ically a fuel system con-
structed in accordance with the invention, and
United States Patent Office 3,514,944
Patented June 2, 1970

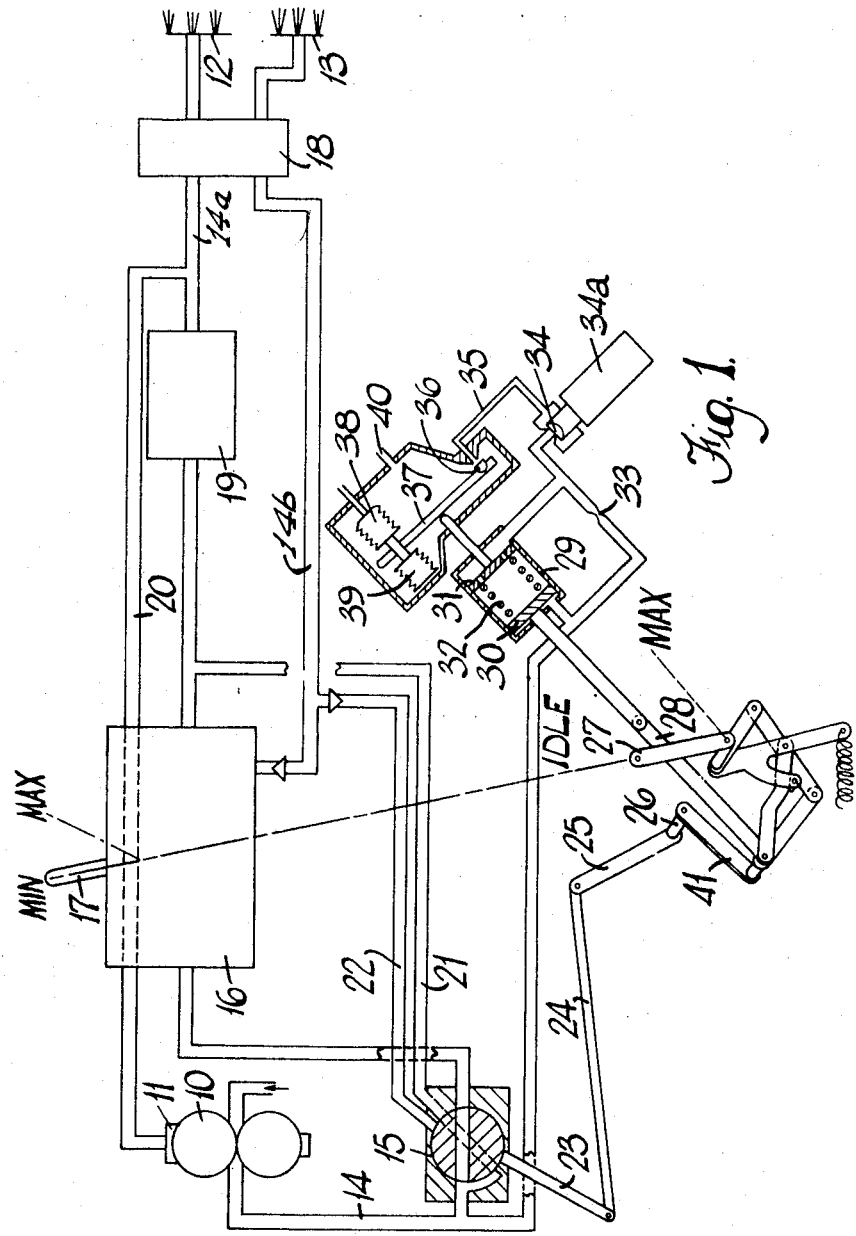

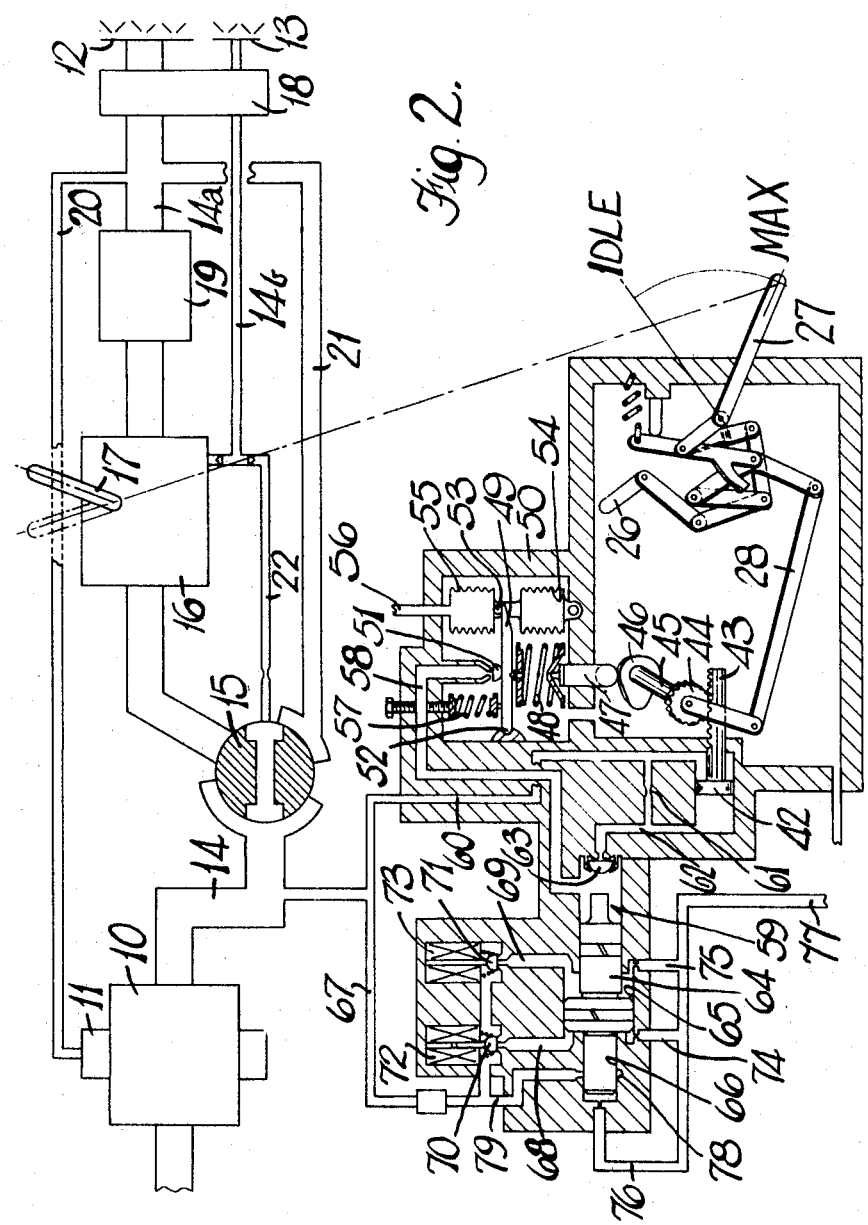

3,514,944
FUEL SYSTEMS FOR GAS TURBINE ENGINES
Denis Gascoigne, Alcester, and Eugene Harold Warne, Solihull, England, assignors to Joseph Lucas (Industries) Limited, Birmingham, England
Filed Nov. 30, 1967, Ser. No. 686,962
Int. Cl. F02c 9/06, 7/22
U.S. Cl. 60—39.09
6 Claims

ABSTRACT OF THE DISCLOSURE

A fuel system for a gas turbine engine having main and emergency passages, with the emergency passages by-passing a fuel control device, a selector valve acting as a second throttle when the emergency passages are selected, a linkage affording control of the emergency fuel supply by means of a main manual throttle control on the device, and a device responsive to an engine parameter, such as compressor pressure, operable when a valve is actuated upon selection of the emergency system.

---

The present invention relates to fuel systems for gas turbine engines and includes apparatus for normal running comprising a fuel control device having an associated manually operable throttle control, with the device being disposed between a fuel supply pump and the engine, the system also including an emergency fuel control device which is manually operable and intended for use in place of the fuel control device, in the event of a failure therein.

The object of the invention is to provide a system of the kind referred to in a convenient form.

In accordance with the present invention, a fuel system for a gas turbine engine having main burners and pilot burners comprising a single pump for supplying fuel to the engine, a main fuel line between the pump and the engine, a selector valve having first and second positions located in the main fuel line, a fuel control device disposed in the main fuel line between the selector valve and the engine, a first throttle incorporated in said fuel control device, a manual control for operating the first throttle, said main fuel line having a first supply passage leading from the fuel control device to the main burners and a second supply passage leading from the fuel control device to the pilot burners, an emergency fuel line between the selector valve and the engine bypassing the fuel control device, said emergency fuel line having first and second lines, said first line communicating with the first supply passage downstream of the fuel control device and said second line communicating with the second supply passage downstream of the fuel supply device for providing means for bypassing the fuel control device, the selector valve in its first position permitting fuel supply through the main fuel line and fuel control device and its second position through the emergency fuel line with said selector valve serving as a second throttle, a linkage assembly connecting the selector valve with the manual control for the first throttle, a device coupled to said linkage assembly and acting upon said linkage assembly when fuel is flowing through the emergency fuel line for controlling the position of the selector valve, means for said last mentioned device responsive to at least one parameter related to conditions within the engine, and said linkage assembly being constructed to be capable of movement when the selector valve is in its first position without altering the position of the selector valve but when the selector valve is in its second position, the linkage assembly moves with the selector valve.

The invention will now be described by way of example with reference to the accompanying drawings in which:

FIG. 1 illustrates diagrammatically a fuel system constructed in accordance with the invention, and FIG. 2 illustrates an alternative form of system.

The systems are for use in controlling the flow of fuel to a gas turbine engine.

The fuel system shown in FIG. 1 comprises a fuel system pump indicated generally at 10 having an associated servo device 11, with the pump being arranged to provide a supply of fuel from a reservoir (not shown) to two sets of burners indicated diagrammatically at 12 and 13, the former being the main supply and the latter being the pilot supply to the engine. The fuel is supplied from the pump along a passage 14 through a device 15 which will be more fully described later, and through a fuel control device 16 of known kind, which has a manual control 17 for operating a throttle within the device 16.

The passage 14 is divided as it leaves the device 16, with the respective passages being indicated at 14a and 14b and being connected to the burners 12, 13 respectively through a common shut off cock 18. The supply passage 14a to the main burners 12 further incorporates a governor device 19 which is responsive to engine speed, and which is arranged to control flow to limit the engine speed to a safe maximum value. A passage 20 leading from downstream of the device 19 to the servo-device 11 of the pump 10 provides a signal for varying the output of the pump 10 in accordance with the pressure of fuel reaching the main burners 12. The system thus far described in substantially conventional, with the exception of the device 15 which is associated with an emergency system now to be described.

The emergency system includes two further passages 21, 22 respectively. The passage 21 communicates with the supply passage 14a to the main burners 12 at a position downstream of the device 16, and the passage 22 communicates with the passage 14b leading to the pilot burners 13, also at a position downstream of the device 16, the two passages 21, 22 therefore providing means for by-passing the device 16. Flow through the passages 14 and 21, 22 is selected by means of the device 15 in first and second positions respectively. The device 15 in the form of a valve in which one position is as drawn and the other as indicated by dotted lines. The two positions afford flow to the main and the emergency supply systems respectively. The device 15, however, is also capable of being used as a second throttle when the passages 21, 22 have been selected.

For this purpose, the device 15 is connected, either through a linkage having parts 23, 24 and 25, or alternatively directly, to a spindle 26, which, in the form illustrated, carries the parts 25. The spindle 26 is connected to a linkage which is of the kind described and claimed in co-pending U.S. patent application Ser. No. 687,063 filed Nov. 30, 1967, having an input member 27 which is connected for moving in unison with the manual control 17 of the device 16, and it also has connected thereto, a second input member 28 which is operatively connected to a piston and cylinder type servo device 29 having a pair of pistons 30 and 31 which are urged apart by a spring 32. The piston 31 is perforated. High pressure from the passage 14 from the pump 10 is admitted to one end of the cylinder of the servo device 29, at one side of the piston 30, and it also admitted to the opposite end of the cylinder at the opposite side of the piston 31 through a passage incorporating a restrictor 33. There is a valve 34 operated by an electrical solenoid 34a, and the valve 34 is disposed in a passage 35, the end of which is controlled by a valve 36 carried by a lever 37 acting upon a piston rod extension of the piston 31. Also acting upon the lever 37 are bellows 38, 39 with the bellows 38 being subjected, in use, to the pressure of air at the engine air intake, and the bellows 39 being evacuated.

It is to be understood, however, that the signal provided by the bellows 38, 39 for controlling the position of the piston 31 in the servo device 29 can be obtained from other sources, such as engine speed or compressor downstream pressure. The enclosure within which the valve 36, lever 37 and the bellows 38, 39 are disposed is connected with the pump inlet through a passage 40.

In use, the emergency system can be selected by operation of the linkage, with the first part of the movement being accomplished by the lever 41 which carries the spindle 26 to provide a change over from the main to the emergency system. At the same time, the solenoid 34a is operated. The device 15 is used as a throttle in the supply passages 21, 22 of the emergency system, and is controlled by the manual control 17 which is, in turn, connected to the input member 27 of the linkage. The effect of the movement of the input member 27 of the linkage upon the device 15 when it is acting as the second throttle in the system, is modified in accordance with the position of the piston 30 in the servo device 29.

Operation of the solenoid 34a opens the valve 34, thus permitting escape of fuel from the passage 14 through the valves 34 and 36. The opening of the valve 36 is controlled in accordance with the pressure obtaining in the bellows 38. This pressure, acting through the agency of the lever 37 determines the position of the piston 31, and thus the stressing of the spring 32 which, in turn, acts upon the piston 30. Since the piston 30 is connected to the second input member 28 of the linkage, the movement thereof causes movement of the second throttle constituted by the device 15.

It is preferred that when the emergency system is to be used, the manual control 17 should be set to the idling position for the engine (as illustrated), and it may be arranged that the solenoid operated valve 34 is only actuated when this position is reached. This arrangement is provided in order to minimize the risk of an excessive rate of acceleration of the engine when the emergency system is selected, with the acceleration being under the direct control of the operator through the manual control 17. Additionally or as an alternative to this arrangement, the servo device 29 may be damped so as to limit the rate of travel of the piston 30. Other means for limiting acceleration can be incorporated in the emergency system.

In the system shown in FIG. 2, similar parts are identified by the same numerals.

The fuel system in FIG. 2 comprises a pump 10 having an associated servo device 11, and the pump is arranged to supply fuel to two sets of burners 12, 13. Fuel is supplied from the pump along a passage 14 through a device 15 and through a main fuel control device, 16, which has a manual control 17.

The passage 14 is divided as it leaves the device 16, into passages 14a, 14b leading respectively to the burners 12, 13 through a common shut-off cock 18. The supply passage to the main burner 12 further incorporates an engine speed responsive governor device 19. A passage 20 leading from downstream of the device 19 to the servo mechanism 11 of the pump 10 provides a control signal for varying the output of the pump 10.

The emergency system includes further passages 21, 22. The passage 21 leads from the device 15 to the supply passage 14a to the main burner 12 at a position downstream of the main fuel control device 16, and the passage 22 communicates with that leading to the pilot burners 13 also at a position downstream of the main control device 16. The two passages 21, 22 are selected by means of the device 15. The device 15 is also capable of being used as a throttle when the emergency passages 21 and 22 have been selected.

The device 15 is connected directly to a spindle 26 of a linkage similar to that of FIG. 1 and has an input member 27 which is connected for movement in unison with the manual control 17 of the main fuel control device 16, and also a second input member 28 which is operatively connected to a piston and cylinder type servo device 42 through a rack and pinion mechanism 43, 44.

A spindle 45 of the pinion 44 carries a cam 46 which acts upon a member 47 to vary the stress in a spring 48 acting upon a lever 49 in an enclosure in a body 50, with the lever 49 carrying a valve closure member 51 on the opposite side from the point of action of the spring 48. One end of the lever 49 is pivotally mounted upon the body 50 at 52 while the other end acts upon a member 53 connected to a pair of bellows 54, 55 with the former being evacuated and the latter being in communication with a passage 56 to which in use, air under pressure from the compressor stage of the engine, is delivered. A further spring 57 permits pre-stressing of the spring 48. The closure member 51 controls flow through a passage 58 in the body 50, and this passage 58 is in communication with a cylinder 59 in the body 50, with the passage 58 thus providing an escape path for fuel contained in the cylinder 59 in accordance with the position of the closure member 51. This is, in turn, dependent upon compressor pressure and also upon the position of the cam 46.

The piston and cylinder device 42 is subjected to the pressure at the downstream side of the pump 10 through a passage 60. Fuel can reach one end of the device 42 directly, while it can only reach the other end through a restrictor 61.

Pressure in the device 42 at the end receiving fuel through the restrictor 61 is also applied in a passage 62, the opposite end of which enters the cylinder 59 under the control of a valve closure member 63. The pressure in the passage 62 forces the valve closure member 63 away from its seating. This condition exists when the emergency system has been selected.

It will be apparent that changes in the compressor pressure will result in changes in the pressure in the cylinder 59 and thus in the cylinder of the device 42. Movement of the piston of the device 42 varies flow of fuel to the engine through the device 15. Such fuel control is also, however, determined by the initial setting of the lever 27 which is under the control of the operator.

To actuate the valve closure member 63 within the cylinder 59, there is provided an electrically operated valve assembly.

This valve assembly has a member 64 axially movable within the cylinder 59, and an enlarged mid-region which is engaged in an enlarged coaxial cylinder 65, and there is also a further coaxial cylinder 66 having the same diameter as the cylinder 59 and at the opposite side of the cylinder 65. The member 64 has three portions engaging in the cylinders 59, 65 and 66 respectively.

Opposite ends of the cylinder 65 can communicate with a passage 67, which in turn communicates with the passage 14 at the outlet side of the pump 10, so as to receive high pressure fuel therefrom. The passage 67 communicates with the respective ends of the cylinders 53, 65 through respective passages 68, 69 which contain respective spring-loaded valve closure members 70, 71. The valve closure members 70, 71 are in turn controlled by a pair of electrical solenoids 72, 73 respectively. Further, but restricted passages 74, 75 also communicate with opposite ends of the cylinder 65 respectively, with these being connected to a further restricted passage 76, and with a drain passage 77. The passage 76 communicates with the closed end of the cylinder 66, and the passage 77 communicates with the upstream side of the pump 10 through a passage (not shown).

In the cylinder 66 there is a gallery 78 communicating through a passage 79 with the passage 67, so that this gallery 78 is also subjected to high pressure from the pump 10.

In use, the position of the member 64 is determined by the application of high pressure fuel at the end thereof, and in the position illustrated, this high pressure is applied through the valve closure member 63 from the passage 60. When the member 64 is in its opposite extreme position, high pressure acts upon the end of the portion of the member 64 which is disposed in the cylinder 66, with high pressure being received through the passage 79 and the gallery 78.

Initiation of the movement of the member 64 is obtained by applying high pressure through alternative passages 68, 69, and actuation of the solenoids 72 or 73 respectively. Once movement of the member 64 in either direction has occurred, the appropriate electrical solenoid can be de-energized, since high pressure will maintain the member 64 in its selected position. With this arrangement reliance is not placed upon the ability to maintain either of the two electrical solenoids in energized condition for the maintenance of the emergency fuel system for the engine.

Having thus described our invention what we claim as new and desire to secure by Letters Patent is:

1. A fuel system for a gas turbine engine provided with main burners and pilot burners, comprising a single pump for supplying fuel to the engine, a main fuel line located between the pump and the engine, a selector valve in said main fuel line, said selector valve having first and second poistions, a fuel control device disposed in said main fuel line between said selector valve and the engine, a first throttle incorporated in said fuel control device, a manual control for operating said first throttle, said main fuel line having a first supply passage leading from said fuel control device to said main burners and a second supply passage leading from said fuel control device to said pilot burners, an emergency fuel line located between said selector valve and said engine bypassing said fuel control device, said emergency fuel line having first and second lines, said first line communicating with said first supply passage downstream of said fuel control device and said second line communicating with said second supply passage downstream of said fuel supply device for providing means for bypassing said fuel control device, said selector valve in its first position permitting fuel flow through said main fuel line and fuel control device and in its second position through said emergency fuel line, with said selector valve serving as a second throttle in said second position, a linkage assembly connecting said selector valve with said manual control for said first throttle, a device coupled to said linkage assembly and acting upon said linkage assembly when fuel is flowing through said emergency fuel line for controlling the position of said selector valve, means for said last named device responsive to at least one parameter related to conditions within the engine, said linkage assembly being constructed to be capable of movement when said selector valve is in its first position without altering the position of said selector valve but when said selector valve is in its second position, said linkage assembly moves with said selector valve, said device including a piston and cylinder unit to which fuel under pressure is applied in use, the selection of the emergency fuel line permitting the creation of a pressure difference at opposite ends of the piston and cylinder unit for controlling the linkage assembly, and said piston and cylinder unit also being variable for controlling the linkage assembly in response to changes in said at least one parameter.

2. The fuel system as claimed in claim 1 including a device responsive to changes in compressure pressures within the associated engines, with said device acting upon the linkage assembly.

3. The fuel system as claimed in claim 1 including electrical solenoid means, a valve operable in response to actuation of said electrical solenoid means, said last named valve controlling a passage communicating with said piston and cylinder unit, and one end of said piston and cylinder unit communicating with the main fuel line directly and the other end communicating therewith via a restricter, with the passage controlled by said valve communicating directly with the other end of said piston and cylinder unit.

4. The fuel system as claimed in claim 3 in which said valve is actuated directly by an electrical solenoid.

5. The fuel system as claimed in claim 3 in which said valve is controlled by a member movable between said first and second positions corresponding to opened and closed position of said valve respectively, and said member being, in use, maintained in either position by fluid pressure, and valve means actuated in response to solenoid actuation for controlling the fluid pressures and hence the position of the member.

6. A fuel system for a gas turbine engine provided with main burners and pilot burners, comprising a single pump for supplying fuel to the engine, a main fuel line between the pump and the engine, a selector valve having first and second positions, said selector valve being located in said main fuel line, a fuel control device disposed in the main fuel line between said selector valve and said engine, a first throttle incorporated in said fuel control device, a manual control for operating said first throttle, said main fuel line having a first supply passage leading from said fuel control device to said main burners and a second supply passage leading from said fuel control device to said pilot burners, an emergency fuel line between said selector valve and said engine bypassing said fuel control device, said emergency fuel line having first and second lines, said first line communicating with said first supply passage downstream of said fuel control device and said second line with said second supply passage downstream of said fuel control device for providing means for bypassing said fuel control device, said selector valve in its first position permitting fuel flow through said main fuel line and fuel control device and its second position through said emergency fuel line, with said selector valve serving as a second throttle, a linkage assembly connecting said selector valve with said manual control for said first throttle, a device coupled to said linkage assembly and acting upon said linkage assembly when fuel is flowing through said emergency fuel line for controlling the position of said selector valve, means for said last named device responsive to at least one parameter related to conditions within the engine, said linkage assembly being constructed to be capable of movement when said selector valve is in its first position, without altering the position fo said selector valve but when said selector valve is in its second position, said linkage assembly moves with said selector valve, said last named device including a piston and cylinder unit to which fuel under pressure is applied in use, the selection of said emergency fuel line permitting the creation of a pressure difference at opposite ends of said piston and cylinder unit for controlling said linkage assembly, said piston and cylinder unit also being variable for controlling the linkage assembly in response to changes in said parameter, electrical solenoid means, a valve operable in response to actuation of said electrical solenoid means, said valve controlling a passage communicating with said piston and cylinder unit, one end of said piston and cylinder unit communicating with the main fuel line directly and the other end communicating therewith through a restrictor, the passage controlled by said valve communicating directly with the other end of said piston and cylinder unit, said valve being controlled by a member movable between first and second positions corresponding to opened and closed positions of said valve respectively, said member being, in use, maintained in either position by fluid pressure, valve means actuated in response to solenoid actuation for controlling the fluid pressure and hence the position of the member, and two electrical solenoid control passages communicating with opposite sides of the member respectively, with the actuation of either solenoid allowing the relief of pressure at a corresponding side of the member allowing said member to move, and de-energization of the solenoids preventing flow through the passages and thus preventing movement of the member.

References Cited

UNITED STATES PATENTS

| | | | |
|---|---|---|---|
| 2,614,617 | 10/1952 | Bodier | 60—243 |
| 2,670,599 | 3/1954 | Davies et al. | 60—39.28 |
| 2,686,561 | 8/1954 | Israeli et al. | 60—39.09 |
| 2,700,872 | 2/1955 | Lee | 60—39.28 |
| 2,830,436 | 4/1958 | Coar | 60—39.28 |

MARK M. NEWMAN, Primary Examiner

U.S. Cl. X.R.

60—39.09